United States Patent

[11] 3,619,321

| [72] | Inventors | Raymond H. Lewis<br>Fort Lauderdale;<br>Donald J. Peters, Boca Raton, both of Fla. |
|---|---|---|
| [21] | Appl. No. | 759,072 |
| [22] | Filed | Sept. 11, 1968 |
| [45] | Patented | Nov. 9, 1971 |
| [73] | Assignee | Roberts Consolidated Industries, Inc.<br>City of Industry, Calif. |

[54] APPLICATION OF FACINGS TO CORES
8 Claims, 9 Drawing Figs.

[52] U.S. Cl. ................................................ 156/249,
118/257, 156/313, 156/320, 156/558, 156/559
[51] Int. Cl. ........................................ B32b 31/12,
B05c 1/14
[50] Field of Search ........................................ 156/247,
249, 320, 313, 556, 558, 559, 562, 498, 499;
118/257

[56] References Cited
UNITED STATES PATENTS

| 2,593,553 | 4/1952 | Francis | 156/540 |
| 2,744,562 | 5/1956 | La Rocca et al. | 156/556 X |
| 2,845,041 | 7/1958 | Karn | 118/257 |
| 2,859,462 | 11/1958 | Shafer | 118/257 X |
| 3,044,534 | 7/1962 | Yoho | 156/249 X |
| 3,247,042 | 4/1966 | Denton et al. | 156/313 X |

*Primary Examiner*—Benjamin A. Borchelt
*Assistant Examiner*—James M. Hanley
*Attorney*—Ephraim Banning, III

ABSTRACT: A machine and method for continuously applying thermoplastic adhesive, in the form of a flexible nontacky spread in a solid state, while mounted on a carrier, to an advancing core to which a facing is to be affixed. The adhesive spread is initially moved past a heating unit, as is each facing, to (1) preheat the facing and (2) liquify the adhesive. The spread of adhesive is then transferred to the core and separated from its carrier in so doing. Thereafter, the facing is advanced to a position against the adhesive spread where it is maintained under a continuing pressure to permit cooling and solidification of the adhesive for permanent union with both the core and facing applied thereto.

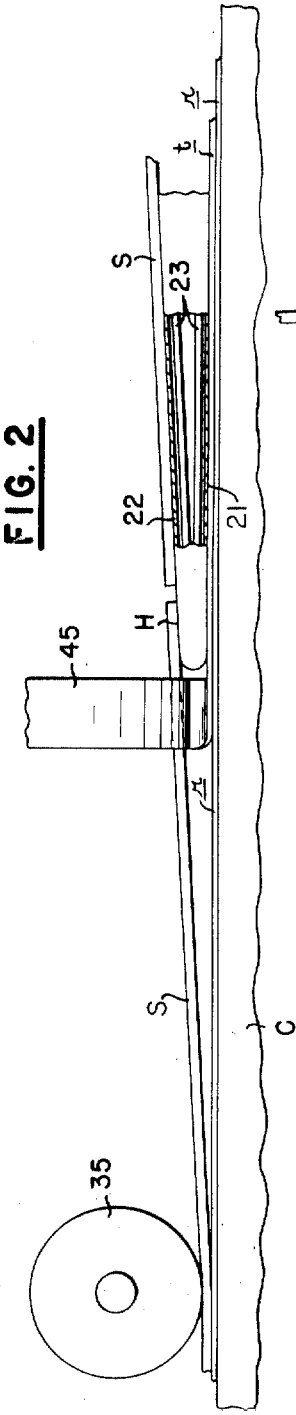
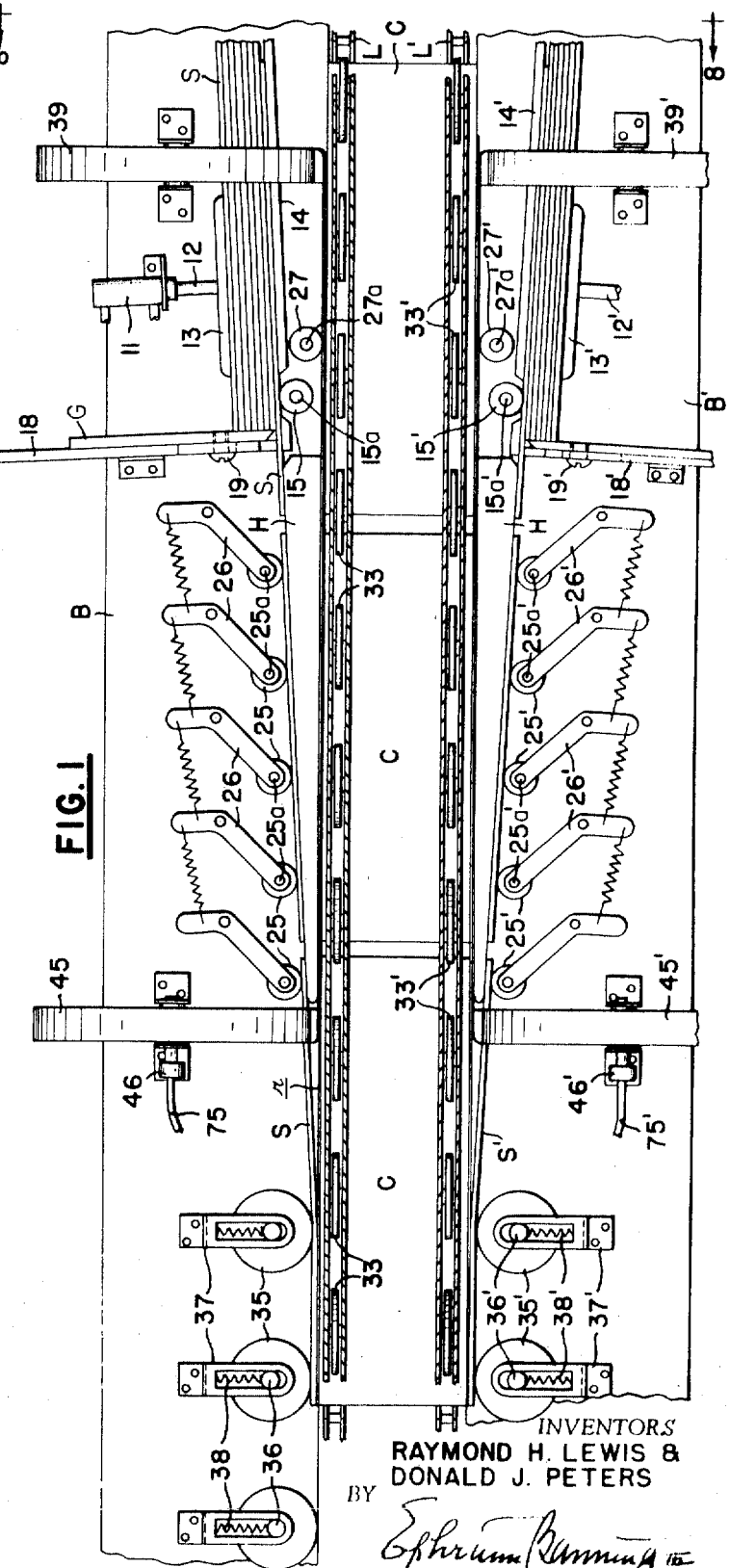

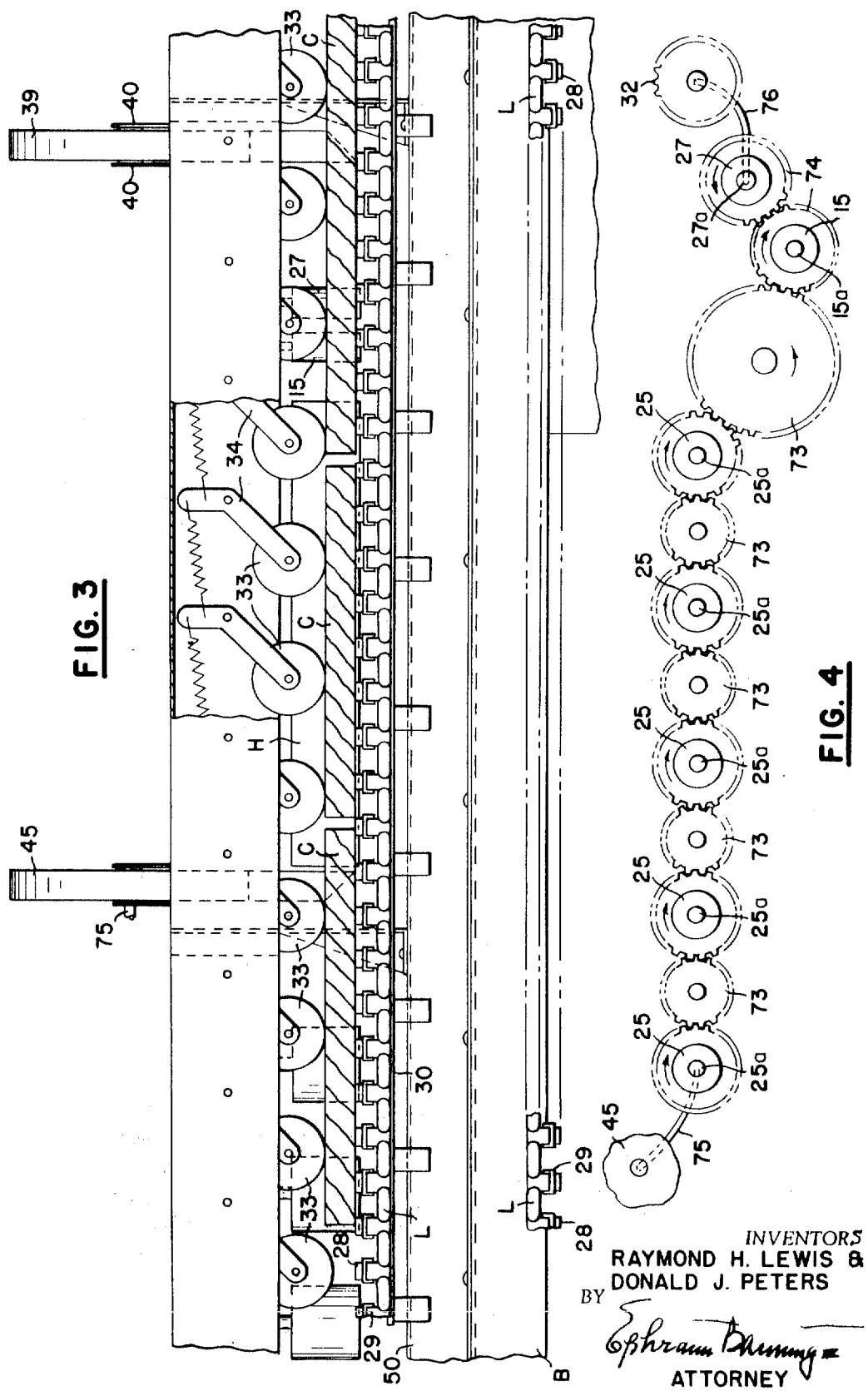

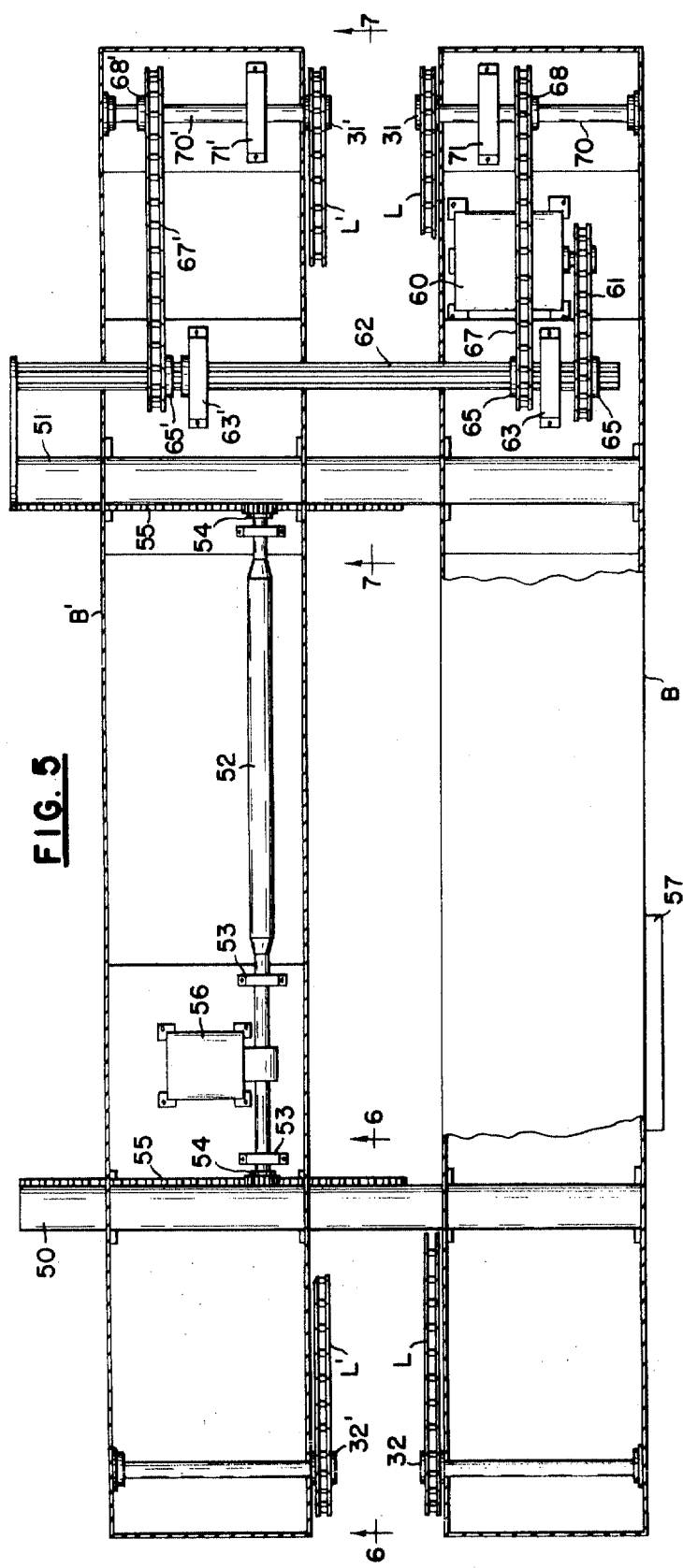
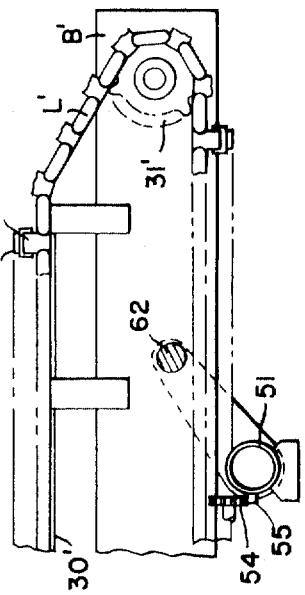
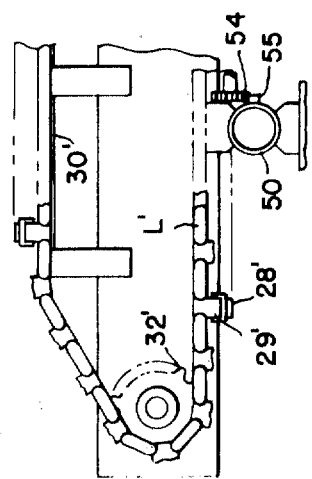

APPLICATION OF FACINGS TO CORES

This invention relates to a means and method for applying facings to a core to be used for any of a wide variety of purposes—furniture pieces, counters, etc. Such facings may be provided by a wood veneer, by a plastic of desired composition, or otherwise. To unite the facings fixedly to a core, an adhesive is commonly employed. In the ensuing description, glue or the like will be considered, by way of example, as the desired adhesive for uniting facings to the edges of a table top.

It has been common practice to employ a hot melt glue in pellet or bulk form, deposited in a pot where it is maintained at a controlled temperature of 350° to 400° F. The glue, when melted, is then transferred by a heated roller extending upwardly from the pot to the work thereabove, usually in a horizontal plane. The amount of glue so transferred is often uncertain, as is its distribution. Since the thickness of a table top core is commonly ⅝ inches to ¾ inches, and the transfer roller is perhaps 2 inches in diameter by 3 inches in height, overcoating of the glue along the top and bottom edges of the core is a frequent experience. This, plus an uncontrollable amount of glue which may be squeezed out in this operation, creates a subsequent problem, requiring trimming the tip and bottom edges when a laminate facing is bonded to the core. There are also other drawbacks which have never been completely overcome, such as oxidization of the glue, when heated, requiring its skimming off from the pot and roller, loss of glue during its transfer and application to the core edge, and waste of time, often 45 minutes or so, while glue in the pot is being raised to the requisite temperature. The cleanup operation which must regularly be performed also involves considerable time, effort and expense.

By the present invention we are enabled to employ an adhesive such as glue for uniting the facings to a core, and in so doing to retain all of the advantages of that adhesive without any of the accompanying disadvantages just noted. We also are enabled to apply the facings in continuous operations with little or no interruptions therebetween, and with safe and proven mechanism for this purpose. Furthermore, a superior bond is produced between the facings and core, and one that is much cleaner and dependable at all times.

These improved results are accomplished by use of adhesive means comprising (1) glue in the form of a thin flexible spread at ambient temperatures, releasably mounted on (2) a flexible carrier, such as paper or the like, to advance the flue spread to a position between the core and the facings to be applied thereto. The widths of the adhesive spread, the carrier therefor, and the core face to which the facing is to be applied, may all be alike, permitting application of the facing with all opposite edges of these components in flush relation with each other and with those of the core. The carrier with its spread of adhesive so engaging the core is then advanced synchronously therewith past a heating unit from which heat is transferred to the carrier-adhesive unit to elevate the glue temperature to the melting point. The facing is also advanced synchronously with the carrier and core, past the heating unit to be preheated thereby while moving through a path which converges with that of the core at a point where the carrier separates itself from the heated adhesive spread which is then liquified for application to a face of the core. Just beyond this point of separation the converging movement path of the facing substantially joins with that of the core, permitting positioning of the preheated facing upon the liquified glue spread for adherence thereto. Appropriate pressure means along both movement paths maintain the contacting faces of the facing, heating unit, carrier and adhesive spread in firm engagement with each other, such pressure continuing through to the end of their movements to accelerate colling of the adhesive spread to a solidified state whereby to prevent slipping of the facing upon the core. In this whole operation, deposit of the glue spread upon the core proceeds uniformly, exactly in the amount needed, and without any spillage or squeezeouts at any point. Cleanup and skimming operations are eliminated, as is any waste of the glue adhesive.

Our invention is concerned with both the method and means employed in these operations. Since there are countless sizes, shapes and contours of cores to which facings may be applied, we have chosen herein, by way of example, a table whose opposite edges may be concurrently faced with a narrow finishing strip with the aid of glue in the form of a ribbon having a paper tape as he carrier therefor. A machine embodying numerous features of advantage for use in applying such a strip facing with tape-glue adhesive means will now be considered along with the accompanying drawings which exhibit its construction in the manner following:

FIG. 1 is a top plan view of an extended portion of the machine, showing a pair of cores in progress therethrough;

FIG. 2 is an enlarged fragmentary side elevation, showing the adhesive means and an adjacent finishing strip in process of thermal conditioning for uniting with the core;

FIG. 3 is a vertical fragmentary sectional view through a pair of cores when positioned in the machine, adjacent parts thereof being shown in elevation;

FIG. 4 is a schematic view of the gear drive which operates the various rollers in engagement with the cores and facings to be united thereto;

FIG. 5 is a plan view of the machine with all work-operating means stripped therefrom to show in elevation (1) the means for adjusting one base relative to the other, and (2) the drive for the chains by which the cores are propelled through the machine;

FIG. 6 is a detail in section at the delivery end of the machine, taken on line 6—6 of FIG. 5;

FIG. 7 is a similar view at the receiving end of the machine, taken on line 7—7 of FIG. 5;

Figure 8:
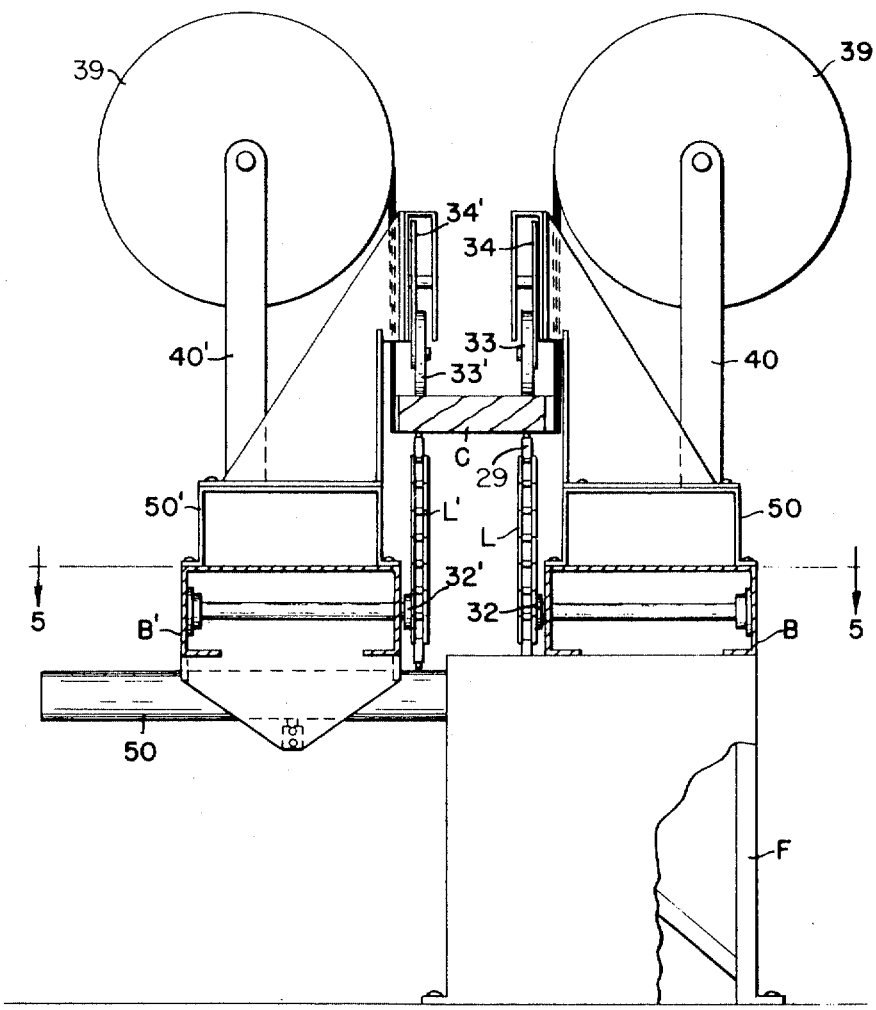
FIG. 8 is a transverse section through the machine, taken on line 8—8 of FIG. 1.

The machine here illustrated is elongated to receive at one end the cores C to be edge-banded while certain finishing strips S are advanced processionally to the delivery end of the machine ready for further treatment elsewhere. Its various operating units, rollers, electrical systems, etc. including the materials to be operated upon, are carried upon two parallel bases B and B', one being adjustable toward and from the other to fixed positions to accommodate therebetween the work which is steadily advanced lengthwise therethrough. The path of movement for the work is horizontal and straight, between duplicate sets of operating units. By adjusting the positions of the two bases, the space therebetween and between the two sets of operating units mounted thereon, may be varied considerably to accommodate cores and facings therefor of many different widths. In the description to follow, the operating units and parts associated therewith on the base B (stationary) will be given one set of reference characters which are duplicated, except for the addition of a prime ('), for the corresponding units and parts on the other base B' (movable).

The machine at its receiving end is provided with a magazine for storage of a plurality of finishing strips S, usually cut to the same length for a concurrent run through the machine. These strips are stacked vertically with their bottom edges rested upon a suitable horizontal base. The strips so stacked are inclined laterally toward the core movement path. From an air cylinder 11 beyond the stack of strips is extended a horizontal plunger 12 equipped at its free end with a head 13 in controlled pressure engagement with the outermost finishing strip in the stack (FIG. 1). By some such arrangement, the innermost strip is held lightly against a vertical retaining wall 14, free for endwise displacement in a forward direction in response to frictional engagement on its opposite face from a rotating roller 15. Where the finishing strips are of flexible material susceptible of being wound upon a spool, the magazine may be replaced by cutting means for severing such material into desired lengths, then advancing each such strip through a release gate G, the same as the precut strips already described.

Such a gate G (FIG. 1), adjustably supported by a fixed rail 18, is disposed ahead of the precut strips to block all forward movement thereof save for the one strip which is in innermost position adjacent the retaining wall 14. For strips which may vary in thickness, either more or less, the gate is slidably shifted in a horizontal plane to open up a correspondingly wide clearance opposite the innermost strip. A screw 19, extending from a tapped hole in the gate through a slot in the rail, may be operated to engage the rail with its head, thereby to clamp the gate fixedly in each such adjusted position.

Beyond the gate is a fixed heating unit H comprising a housing having opposite walls providing inner and outer faces 21 and 22 (FIG. 2), each smooth and converging toward the other, the outer face being aligned with the retaining wall 14. The inner face is disposed parallel with the straight movement path of the cores proceeding through the machine. The housing walls providing such faces are formed of material having excellent heat conductivity whereby heat electrically generated by one or more heating elements 23 within the housing is efficiently transmitted therefrom to preheat each finishing strip S which is processionally advanced along its outer face 22 in sliding contact therewith. Each finishing strip as it passes through the gate is guided to a working position flatwise against the outer face 22 of the heating unit, to be held firmly thereagainst by a plurality of driven friction rollers 25 engaging therewith, spaced closely apart and mounted on spring-biased pivoted brackets 26. At the forward end of the heating unit H, both of its converging faces 21 and 22 meet to reduce thereat to a negligible point the distance separating each advancing strip S from the core movement path.

A core edge to be banded by the mechanism described herein is usually much in evidence when applied to the tops of desks, tables, counters, etc. The thickness of the cores for such products may vary, but ¾ inch is quite common. The lengths of the cores may range considerably — to be furnished in specified dimensions, or to be subsequently cut down to any convenient length, possibly when installed on the job. Preferably each core length is slightly less than that of its associated strip, it being easier to trim off any excess length thereof than to precisely position each strip evenly with the core at the start of their movements lengthwise of the machine. Initially each core starts its movement between a pair of side driving rollers 27 and 27′ (FIG. 1) while the core is rested upon a plurality of resilient pads 28 (FIGS. 3 and 8) carried upon lugs 29 upstanding from the upper run of an endless chain L. Supporting this run of the chain is an elongated rail 30 to prevent any sag thereof during its movement over sprocket wheels 31 and 32 adjacent opposite ends of the machine.

Narrow idling rollers 33 and 33′, disposed in alignment with their axes crosswise of the machine, are arranged at plural points lengthwise thereof adjacent opposite edges of the core to press downwardly thereon at points directly above the supporting chains L and L′ (FIG. 8). By this means we assure a firm engagement of the core with the friction pads, as well as its steady advance concurrently with movement of the chains. Each top roller is carried by a spring-biased pivoted bracket 34 whereby to exert resilient pressure force against the core. The movement path of the cores, when carried upon the pads, continues to be horizontally straight between opposite sets of relatively large side guiding rollers 35 and 35′ (FIG. 1), each set being mounted in alignment along one core side beyond the heating unit to engage with the finishing strip then applied thereto. As shown in FIG. 1, each idling roller 35 and 35′ is provided with an axial shaft 36 whose opposite ends are slidingly supported in slotted brackets 37 with an associated spring 38 biasing the roller toward the core edge.

Figure 9:
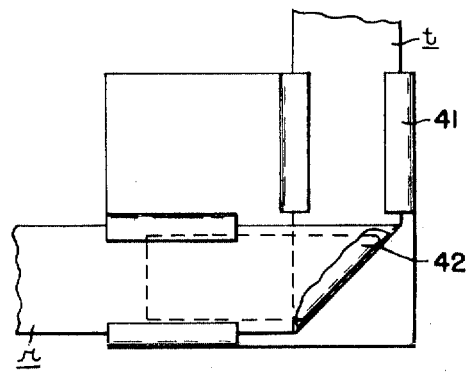
FIG. 9 is a detail in elevation of one of the guides for the adhesive means at a point where its direction of movement is changed.

A major problem to be met is the uniform and clean application of an adhesive to the contacting faces of each strip and the core edge to which it is to be affixed. This is solved by use of a tape t of paper or the like, which is initially wound upon a supply spool 39 (FIGS. 1 and 9), with a thin ribbon r of adhesive, such as glue, interleaved therewith. Such a composite structure, herein referred to at times as "adhesive means" is commonly known as a hot melt tape. At ambient temperatures it is flexible, nontacky, and easy to handle. At temperatures ranging widely upwardly from 250° F. or so, it becomes liquified and free-flowing, depending upon its composition. By interleaving such a ribbon of glue with a tape of paper or the like, the adhesive means acquires a tensile strength comparable with that of the tape although never adhered thereto. To prevent any such adhesion, the paper is treated with a suitable "release" which acts as a repellent to facilitate separation of one from the other at any time. As an adhesive, the glue ribbon, when combined with a tape, is ideal for unsupported movements lengthwise of itself in response to a tractive force applied to its leading end.

The supply spool 39 for the present adhesive means is mounted upon a pair of upstanding brackets 40 to one side of the machine near its receiving end (FIGS. 1 and 3). The tape t with accompanying glue ribbon r is then led downwardly through a guide 41 (FIG. 9) toward the proximate core edge, then executes a turn of 90° around the angled rounded end of a corner plate 42 to take a position flatwise of the core edge ready to be engaged by the side idling roller 27. This roller act to press the tape firmly toward the core, with its ribbon face in contact therewith, at a point shortly in advance of the heating unit H. This roller also remains continuously in engagement with the tape t which then advances along with the core after its initial application thereto. The glue ribbon r, applied directly to the proximate edge of the core, also rides along therewith while its associated tape t slides along the inner face 21 of the heating unit (FIG. 2). Means hereafter to be described act to maintain the contacting faces of the tape and inner face 21 of the heating unit in close firm engagement so that the tape and ribbon, when positioned therebetween to travel with the core, will be heated thereby with its thin glue ribbon rapidly raising to the melting point which may be conveniently attained at a point as low as 250° F. The glue ribbon whose thickness need be only 0.06 inch or so, is sensitively responsive to the heat thus conducted to it through the paper tape, and when in a melted state is free to enter the pores of the core and strip for tenacious adherence thereto.

Continued movement of the tape, with its ribbon component firmly pressed against the core edge, ends at a point slightly beyond the heating unit. There the tape proceeds through a guide similar to the guide 41 to execute a turn around the angled rounded end of an associated corner plate, then continues on upwardly and away from the core for rewinding upon a spool 45 which is operated through a slipclutch 46 from power transmitted thereto, as will be later explained. Since the endless chain L advances the core to which the ribbon is adhered with increasing tenacity as it moves past the heating unit, a substantial propelling force is transmitted from the core to the adhesive means whereby to cause it to travel along with the core with but very little aid from the rotating takeup spool 45. The function of this spool is thus largely confined to taking up any small amount of slack forwardly of the heating unit where the tape separates itself from the hot glue ribbon r.

Throughout the balance of the core movement, the several side idling rollers 35 and 35′ remain pressure-engaged with the freshly-applied strip S to maintain it in firm contact with the core edge (FIG. 1). At this stage, the glue is still soft and incapable of preventing sliding movements of the strip thereon, should it encounter any untoward force. It is important that the glue ribbon be rapidly cooled to expedite its change to a solidified state to avoid any such mishap, and for this purpose the several idling rollers in biased engagement with the strip remain so to serve as thermal conductors thereby to promote cooling thereof. Aluminum or some such metal high in thermal conductivity may be used with advantage as the material for these rollers. By the time the core has completed its travel to the delivery end of the machine, the glue will have cooled and set sufficiently for safe handling of each core with strip attached in any succeeding operations involving the product. It will be feasible to further extend the machine lengthwise for accommodation of (1) trimming means whereby to remove any excess material projecting beyond any face of the core, (2) means for applying strips to opposite end edges thereof, and (3) means for applying a facing of laminate or other material to its top face. The combination of such additional means with the present machine structure, or their use in separate machines, is optional.

The machine herein illustrated is duplex, as already noted. It comprises two duplicate sets of aligned operating means on separate elongated channeled bases B and B' (FIG. 8), 47 each supported on a common framework F (FIG. 8). The base B' is movable in its entirety toward and from the other, always in parallelism therewith, whereby to vary the intervening space wherein the cores are processionally advanced through the machine. Since the widths of the cores may vary considerably, any necessary adjustment should be made at the start of operations whereby the two sets of operating means are properly positioned adjacent opposite sides depending the cores. As shown in FIG. 5, heavy supporting members 50 and 51 are extended horizontally from the framework to provide a pair of widely spaced strong tubular supports whereon the base B' may be slidably shifted toward and from the other base B in response to rotation of a horizontally extending shaft 52 mounted in bearings 53, the shaft being equipped at opposite ends with gears 54, each in mesh with a transverse rack bar 55 (FIG. 5) affixed to one of the tubular supports 50 and 51. A reversible motor 56 driving the horizontal shaft through a reduction gear employs the rack and gear connection just noted to shift the base B' one way or the other, depending upon the direction of rotation of the motor. A suitable control panel 57 (FIG. 5) at the front of the machine may be provided whereby the motor will be energized from a power source to start, stop, or operate either way. An attendant working near the machine will be enabled to operate the controls whereby to adjust the base B', when and as needed, also control the heating unit and all other operations of the machine, either singly or in any combination desired.

The chain-core advancing system is also duplex in that two parallel endless chains L and L' are provided, each mounted on one of the two bases whereby to shift therewith in response to any adjustments therebetween. Operation of both chains in unison results from use of a single motor 60 (FIG. 5) carried on the fixed base B. From the shaft of this motor a chain 61 is driven to operate a splined cross shaft 62 which is rotatably supported in bearings 63 and 63', one on each base B and B'. From sprocket wheels 65 and 65' on the cross shaft, chain connections 67 and 67' lead to sprocket wheels 68 and 68' on jack shafts 70 and 70' which are rotatably mounted in bearings 71 and 71' affixed to the bases B and B', respectively. The sprocket wheels 31 and 31' are carried on the two jack shafts, each to drive one of the endless chains L and L'. It will be noted that the cross shaft 62 is splined to key with grooves (not shown) in the sprocket wheel 65' comprised in the chain connection 70', whereby this sprocket wheel is free to slide axially thereupon in response to adjustments of the base B'. By some such means as this, adjustments of this base may be performed without disturbing the driving connections for both cahins L and L'. It will be further noted that the friction pads on the two chains will always support each core at points adjacent opposite edges thereof, regardless of its width, also that the top idling rollers 33 which bear down upon the cores adjacent their opposite edges will remain always directly opposite the supporting pads therebelow in all adjusted positions of the base B'— an important feature where facings are to be applied to edges of a core.

In FIG. 4 we have shown schematically a gear train starting with an idling gears 73 which intermeshes with other gear affixed to shafts 25a whereon the friction rollers are mounted. Power is also transmitted from the gear 73, as through to an idling gear 74 in connection with gears mounted fast on the shafts 15a and 27a for the rollers 15 and 27. Also, a connection, as by a flexible shaft 75, extends from the gear train to the slip clutch 46 for operation of the takeup spool 45. A further connection, as by a flexible shaft 76, interconnects the gear train with the sprocket wheel 32 around which the endless chain L is moved. As a result, operation of the machine, through power transmitted from the motor 60, will produce concurrent operation of the gear train and of (1) the rollers 15 and 27, and also of (2) the takeup spool, thereby assuring coordinated movements of the cores, the strips therefor, and the adhesive means advancing therebetween.

A machine of the general kind herein discussed is eminently suitable for applying facings to cores varying widely in size, type and contour. The exemplification herein shown and described in detail is but one of many which may embody the novel and improved features of this invention. Operations of the machine are relatively speedy, perhaps 60 feet per minute, so as to be economical volumewise. And its use of an adhesive, initially in a solid flexible state along with a carrier to deliver it to the work, is particularly advantageous since considerable time, effort and expense are obviated. Also, no preheating of the adhesive is required, nor any subsequent cleanup operations such as are regularly involved following use of glue in a heated pot. Application of the adhesive, moreover, may be accurately controlled, its distribution be uniform, and its spread be confined within the limits of the contacting area of the cores and facings therefor, so that little or no excess of adhesive material need ever be removed.

The cores may be placed operatively in the machine by hand, or otherwise. When so positioned, each core then engages a trigger (not shown) to close for a predetermined time an electrical connection leading to the motor 60 whose ensuing operation sets in motion all units which are driven thereby. This operation continues for a period well in excess of the period required for all cores in the machine to be processed while traveling therethrough. Thereafter, if no additional cores be placed in the machine, all operations will cease. Each core is spaced a foot or so from those ahead and behind, and after processing will readily separate from the others through breaking of the connecting glue ribbons, thereby to permit its removal from the machine at its delivery end. By some such means as this, the machine is assured of continuous operation so long as cores are operatively placed therein with no extended time intervals therebetween.

We claim:

1. Mechanism for uniting a facing element to a core element comprising means for advancing a core element through a main first path, means for advancing a relatively thin flexible carrier through a second path, first toward that of the core element and then closely adjacent and parallel thereto to be joined therewith, a thin thermoplastic adhesive spread in a normally flexible and nontacky state at ambient temperatures, releasably applied to one face of the carrier to be advanced conjointly therewith, first toward and then parallel to the movement path of the core element to position the adhesive spread flatwise against the proximate face thereof, a heating unit and pressure means fixedly stationed adjacent the path of the carrier-adhesive unit for conducting heat and pressure thereto at a point short of its arrival at the main path of the core element, whereby to render the adhesive spread soft and tacky for firm attachment to the core element when advanced into flatwise contact therewith, means beyond the heating unit and pressure means for separating the carrier from the adhesive spread while the latter remains in pressurized flatwise contact with the proximate face of the core element whereby to complete a transfer of the adhesive spread thereto, means for advancing a facing element through a third path, first toward that of the core element and then adjacent thereto to join therewith and firmly contact the tacky adhesive spread then applied thereto, preliminary to forming, upon its solidification, an inseparable and permanent bond between the core and facing elements, and means for coordinating operations of all advancing means to assure synchronous and continuous movements of a succession of processionally advancing core and facing elements, then bonded together by the adhesive spread therebetween to a point of discharge from the mechanism.

2. Mechanism for uniting a facing element to a core element, as specified in claim 1, wherein
the heating unit is so positioned as to preheat the advancing facing element prior to its positioning upon the core element.

3. Mechanism for uniting a facing element to a core element, as specified in claim 1, wherein
the means for pressing the heated facing element against the adhesive spread is duplicated at plural points along the movement path of the carrier, and the material so pressing the facing element is endowed with high-thermal conducting value whereby to enhance cooling of the adhesive spread to expedite its return to a solidified state.

4. Mechanism for uniting a facing element to a core element, as specified in claim 1, wherein
the means for advancing the carrier along with the core element is a power-driven roller in engagement with the carrier to maintain its adhesive spread at that point against the advancing core element firmly and with sufficient frictional force to propel the carrier forwardly along with the core element, and a power-driven spool whereon the carrier is rewound following its separation from the adhesive tape whereby to prevent any accumulation of slack in the carrier beyond that point.

5. Mechanism for uniting a facing element to a core element, as specified in claim 1, wherein
a magazine is provided for holding a supply of stacked facing elements proximate to the core element with the innermost facing element in the stack aligned with a face of the heating unit to be engaged thereby when forwardly advanced into contact therewith,
a friction roller in engagement with the innermost facing element is constantly rotated to exert a forwardly propelling force thereagainst, and
succeeding facing elements stacked in the magazine are automatically shifted, one at a time, into the innermost position, when and as vacated by displacement of a facing element therefrom, to be successively engaged by the friction roller and advanced for movement in a fixed path behind the next preceding facing element for propulsion thereof past the heating unit and therebeyond.

6. The method of applying a facing element to a the exposed element of wood or the like during concurrent movements through adjacent paths, which comprises the steps of (1) advancing between the facing and core elements a flexible carrier to which is releasably applied a thin thermoplastic spread of adhesive which, at ambient temperatures, is in a normally nontacky, solidified and flexible state, (2) in concurrently positioning the adhesive spread on the carrier-adhesive unit flatwise against the core element and subjecting the carrier to heat and pressure whereby to thermally condition the adhesive spread for attachment to the core element, (3) in thereafter stripping the carrier from the adhesive spread, leaving the latter fixedly applied to the core with the outer face of the spread fully exposed, (4) in positioning flatwise upon the exposed face of the adhesive spread, then conditioned for adhesion, a facing element to advance concurrently therewith, and (5) in subjecting the facing element to pressure engagement with the thermally conditioned adhesive spread, at plural points lengthwise thereof through its continued movement during which the adhesive spread is solidified for permanent attachment to both the facing and core elements.

7. The method according to claim 6 wherein each advancing facing element is subjected to heat before its positioning upon the thermally conditioned adhesive spread whereby to enhance the ensuing bond between the facing and core elements.

8. The method according to claim 6 wherein each advancing facing element is subjected to pressure engagement from plural cooling means following its application to the core element thereby to enhance cooling of the thermally conditioned adhesive spread and expedite its conversion to a normal solidified state.

* * * * *